United States Patent

Pearson, deceased

[15] 3,700,090
[45] Oct. 24, 1972

[54] CONVEYOR AND ARTICLE FOR HANDLING APPARATUS

[72] Inventor: Reinhold A. Pearson, deceased, late of Spokane, Wash. by Alma Pearson, executrix

[73] Assignee: R. A. Pearson Company, Spokane, Wash.

[22] Filed: March 12, 1971

[21] Appl. No.: 123,701

[52] U.S. Cl. ..................................198/34, 198/102
[51] Int. Cl. ........................B65g 47/26, B65g 37/00
[58] Field of Search ..........................198/34, 26, 102

[56] References Cited

UNITED STATES PATENTS 2,731,130   12/1956   Blickenderfer ...............198/34
2,015,187   9/1935    Mayer .........................198/34

FOREIGN PATENTS OR APPLICATIONS 142,615   4/1960   U.S.S.R. ......................198/34

Primary Examiner—Richard E. Agerter
Attorney—Greek Wells et al.

[57] ABSTRACT

An apparatus for longitudinally spacing articles on a conveyor as they are carried along a first conveyor. An adjacent longitudinally aligned conveyor surface receives each article. One of the adjacent ends of the conveyor surfaces is moved elevationally relative to the other. A transverse stop is spaced above the conveyor surfaces adjacent to the rear end of the receiving conveyor surface. Movement of the surface alternately positions the stop for clearance of articles moving beneath it for blocking movement of an oncoming article. A forward stop is provided for collecting articles on the receiving conveyor surface when desired.

13 Claims, 11 Drawing Figures

CONVEYOR AND ARTICLE FOR HANDLING APPARATUS

BACKGROUND OF THE INVENTION

The disclosure herein relates to an apparatus for selectively spacing articles along a conveyor, either singly or in groups. Packaging operations often involve the handling of articles, cartons or cases along moving conveyors with the articles either irregularly spaced along the conveyor surface, or abutting one another in a continuous row or rows. It is often necessary to subsequently handle the articles in a controlled spatial relationship with individual articles or groups of articles collected and spaced along the conveyor. As an example, articles and cartons are sometimes covered by an empty receiving case as they move along a conveyor. Placement of the case requires that the articles be grouped, if a multiple number are being handled, and be spaced from adjacent articles so that the case can be inserted between them.

Conventional methods of spacing articles along a conveyor normally involve the insertion of stop members or moving guides between adjacent cases. This requires careful indexing of the incoming articles. It sometimes results in damage to the article due to forces caused by movement of the stop members.

As a new alternative, the present disclosure utilizes an intermediate conveyor surface to which the articles are directed in a longitudinal row. A transverse stop is spaced above the conveyor surfaces adjacent to the rear end of the receiving surface. Means is provided for effecting relative elevational movement of the adjacent ends of the conveyor surfaces between a first position at which articles are transferred between the conveyor surfaces and a second position wherein such transfer is prevented by abutment of the stop by the incoming articles. A second transverse stop may be provided forward of the elevated stop for selectively grouping articles on the receiving conveyor surface when the articles are to be subsequently handled in multiple groups.

SUMMARY OF THE INVENTION

The invention relates to a basic apparatus for longitudinally spacing articles along a conveyor, including first and second conveyors having longitudinally aligned conveyor surfaces with their ends adjacent to one another. A transverse stop is spaced above the conveyor surfaces adjacent to the rear end of the second conveyor onto which articles are delivered. Elevating means is operatively connected to one of the conveyors for selectively effecting relative elevational movement of the respective adjacent ends of the conveyors between a first position at which articles are transferred from the first conveyor to the second conveyor beneath the stop and a second position wherein this transfer is prevented by abutment of the stop. Forward stop means may also be interposed in the path of the articles on the second conveyor for selectively preventing movement of an article at a position wherein the rear end of the grouped articles is located beneath the transverse stop.

It is the first object of this invention to provide a mechanically simple apparatus interposed along a longitudinal conveyor for selectively spacing individual articles or groups of articles for subsequent processing steps.

Another object of this invention is to provide an apparatus for grouping articles along a longitudinal conveyor which does not include movable elements which must be forced between adjacent articles in order to cause longitudinal separation of them.

Another object of this invention is to provide an apparatus which can simultaneously group and separate articles along a continuously operating conveyor assembly.

These and further objects of the invention will be evident from the following disclosure, taken also with the accompanying drawings, which illustrate a preferred form of the invention.

DESCRIPTION OF THE DRAWINGS

FIG. 5 shows initial reception of a first carton on the collecting conveyor;

FIG. 6 shows reception of a second carton on the collecting conveyor;

FIG. 7 illustrates discharge of the collected cartons;

DESCRIPTION OF THE PREFERRED EMBODIMENTS

Figure 1:
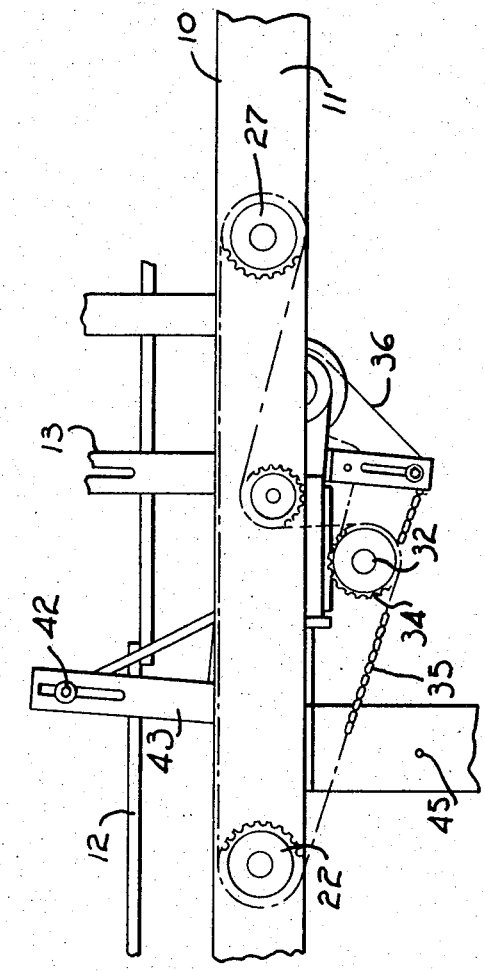
FIG. 1 is a side elevation view showing the conveyor components in relation to the present invention.
Figure 2:
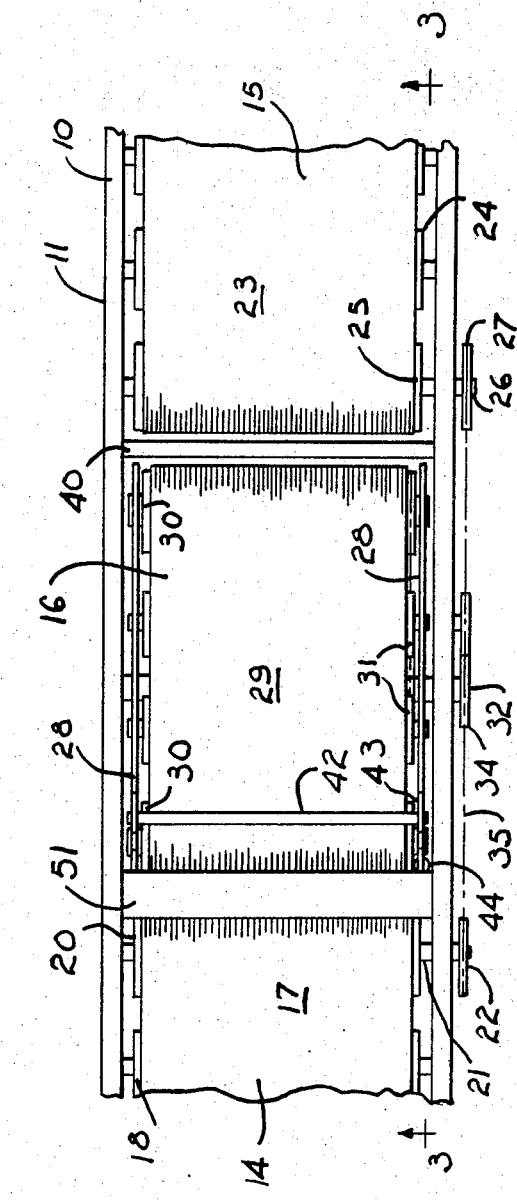
FIG. 2 is a top view of the apparatus shown in FIG. 1.

The following description relates to the spacing or indexing of articles along a moving conveyor, either singly or in multiple groups. As used herein, the term "article" shall refer to any type of object carried along a moving conveyor for subsequent handling, either as part of a manufacturing process, as part of a packaging process, or for any other purpose. Such objects include but are not limited to cartons, whether filled or unfilled, which are carried along the moving conveyor surface for subsequent handling. Reference also shall be made herein to the handling of "article units". The term "article unit" may refer to a single object, such as a carton, or to a desired grouping of articles, such as two cartons longitudinally abutting one another on the conveyor.

The basic operation carried out by the instant apparatus is the reception of a single article unit on a controlled conveyor surface and the longitudinal spacing of that article unit with respect to articles rearward of it on a delivery conveyor surface. In the detailed example shown in FIGS. 1–7, the delivery conveyor transfers the various articles or cartons to a collecting conveyor longitudinally aligned with it. The articles or cartons are received on the collecting conveyor under a transverse stop.

When the desired article unit is received on the collecting conveyor, elevational adjustment is effected between the collecting conveyor and the receiving conveyor, simultaneously discharging the article unit and preventing further transfer of incoming articles from the delivery conveyor to the collecting conveyor. This results in the article unit being longitudinally separated from the articles rearward of it. The grouped articles that comprise the desired article unit can then be subsequently handled as desired. As an example, they can be covered as a group by a receiving case delivered along an intersecting path leading from above the conveyors. They might also be directed to conventional handling equipment for stacking purposes. Manufactured articles or objects might be inserted into cartons as a group by conventional machinery.

Reference will now be made to the specific example of the apparatus illustrated in FIGS. 1–4. The apparatus may be provided at any desired location along a longitudinal conveyor handling the objects or articles which are to be controlled or grouped as desired. The exterior framework for the conveyors is generally indicated in the drawings by the numeral 10. It includes longitudinal side rails 11 that extend the entire length of the assembly. Longitudinal guides 12 are located in continuous paths at each side of the conveyors and are fixed with respect to framework 10 by upright support brackets 13 mounted to the respective side rails 11. The guides 12 engage the sides of articles carried along framework 10 so as to maintain the articles in the desired longitudinal path.

The assembly illustrated comprises three conveyor units. These are denoted as a delivery conveyor 14, a receiving conveyor 15, and an interposed collecting conveyor 16. The conveyors 14, 15 and 16 are longitudinally aligned along a common longitudinal path. They are located in adjacent end-to-end relationship with their respective ends adjacent to one another so that articles can be transferred from conveyor 14 to conveyor 16 and then to conveyor 15. Movement of articles along the conveyors 14, 15, 16 is from left to right in FIGS. 1–4.

The delivery conveyor 14, which is supplied with articles from any suitable source (not shown), includes an endless belt 17 carried by support rolls 18 that extend across the side rails 11 of frame 10. A terminal roller 20 is provided at the delivery or exit end of conveyor 14. The upper flight of belt 17 is wrapped over the terminal roller 20 and extends rearwardly beneath the rolls 18 in the return flight for the conveyor. The mounting shaft for roller 20 is indicated at 21. A sprocket 22 is fixed to shaft 21 outwardly adjacent to framework 10.

The receiving conveyor 15 is longitudinally spaced from the delivery conveyor 14, the spacing between them being substantially equal to the length of an article unit desired to be received on the collecting conveyor 16. The receiving conveyor 15 also comprises an endless belt 23 carried by transverse support rolls 24 rotatably mounted between the side rails 11. A terminal roller 25 at the rear end of conveyor 15 has belt 23 wrapped about it. The upper or article engaging surfaces of belts 17 are shown as being in a common plane. The roller 25 is fixed to a shaft 26 having a sprocket 27 fixed to it outwardly adjacent side rail 11. Sprockets 22 and 27 are identical in size and rollers 25 and 20 are identical in diameter.

The intermediate or collecting conveyor 16 receives articles from delivery conveyor 14 and controls their discharge onto receiving conveyor 15. The collecting conveyor frame 28 is located between the side rails 11 and is longitudinally intermediate conveyors 14 and 15. Frame 28 mounts two transverse terminal rollers 30 which are longitudinally spaced from one another and about which an endless belt 28 is entrained. The upper or article-supporting flight of belt 28 is elevationally supported by transverse rolls 31 rotatably journaled on the frame 28 between the terminal rollers 30. The support shaft 32 extends transversely beneath frame 28 and is rotatably journaled on frame 28 by bearing brackets 33 at each side thereof. One end of shaft 32 has a sprocket 34 fixed to it. The sprocket 34 is located in a vertical plane common to the previously described sprockets 22, 27. Sprocket 34 is slightly smaller in size than the sprockets 22, 27. These three sprockets are engaged by a driving chain 35 used to operate the belts 17, 23, 29 in unison. Driving power may be supplied through belt 23 from a motor (not shown) at the right hand end of conveyor 15.

Belt 29 is driven from shaft 32 by means of a chain 36 that engages a sprocket 37 fixed to shaft 32 intermediate its ends and a longitudinally aligned sprocket 38 fixed to the shaft for the forward terminal roller 30 on frame 28. Because of the respective sizes of the sprockets involved, the upper surface of belt 29 moves longitudinally at a slightly faster rate then the speed of belt 17 or belt 23.

Figure 3:
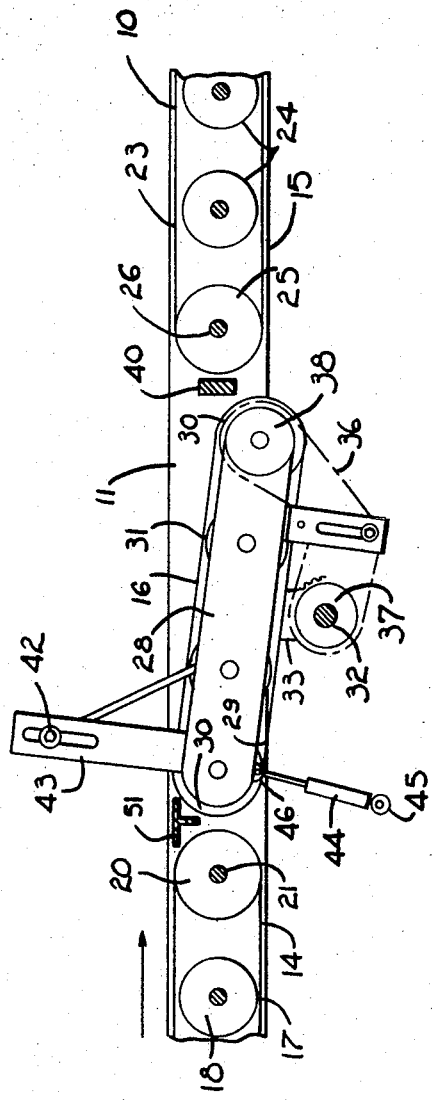
FIG. 3 is an elevational section view taken along line 3—3 in FIG. 2.
Figure 4:
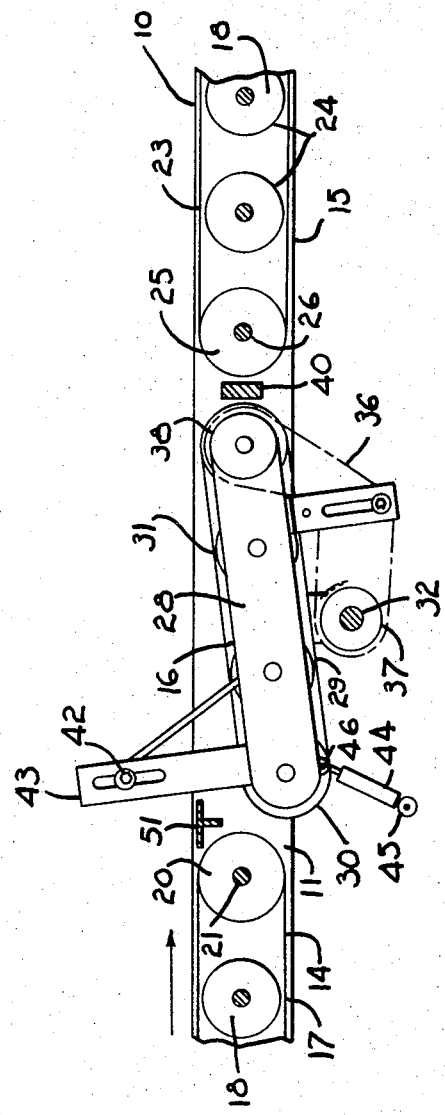
FIG. 4 is a view similar to FIG. 3 illustrating the alternate position of the collecting conveyor.

As can be seen in FIGS. 3 and 4, the shaft 32 is preferably positioned at the midpoint of frame 28. Its elevation on framework 10 is preferably such that the upper surface of belt 28 at its center located vertically above shaft 32 is slightly depressed from the plane of the respective upper surfaces of belts 17 and 23. Thus it is necessary that the upper flight or surface of belt 29 be angularly inclined to alternately bring one end or the other of that surface to the elevation of the respective conveyor surfaces adjacent its ends.

To facilitate transfer of articles from conveyor 14 to conveyor 16, a transverse jump plate 51 extends between side rails 11. Its upper surface is co-planar with the upper surface of belt 17.

A fixed transverse stop plate 40 extends across the side rails 11 intermediate conveyors 15 and 16. The plate 40 has an upright rear surface terminating along an upper edge which is located in a plane no higher than the plane of the upper surface along belt 23. The upper edge of plate 40 is preferably depressed slightly from the upper surface plane of belt 23, the amount of such elevational depression being lower than the maximum elevational depression of the adjacent end of belt 29.

Also mounted to the pivoted frame 28 for collecting conveyor 16 is an elevated transverse stop 42. Stop 42 extends over belt 29 adjacent to the rear end thereof. It is adjustably secured to upright support brackets 43 fixed to the respective sides of frame 28. The height of stop 42 above the upper surface of belt 29 is such as to permit articles to be freely moved beneath stop 42 on belt 29. Its lower surface or edge is spaced above the top of such articles an amount less then the maximum elevational depression possible between the rear end of conveyor 16 and the adjacent end of conveyor 14.

The angular position of frame 28 about the axis of shaft 32 is controlled by a pneumatic cylinder assembly 44. The lower end of cylinder assembly 44 is connected by a pivotal bracket 45 to the fixed framework 10. The upper end of cylinder assembly 44 is connected by a pivotal bracket 46 to the frame 28. The stroke of cylinder assembly 44 is such as to alternately place the rear end of conveyor 16 in a co-planar relation to the exit end of delivery conveyor 14 (FIG. 3) or to place the forward end of conveyor 16 in a co-planar relation to the rear end of receiving conveyor 15 (FIG. 4).

Figure 5:
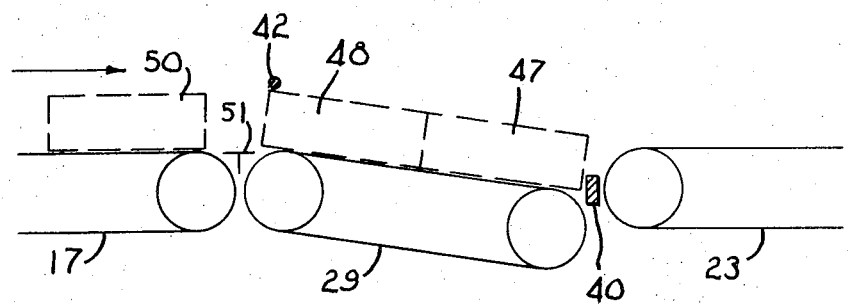
FIGS. 5, 6 and 7 are schematic elevation views illustrating the operation of the apparatus.
Figure 6:
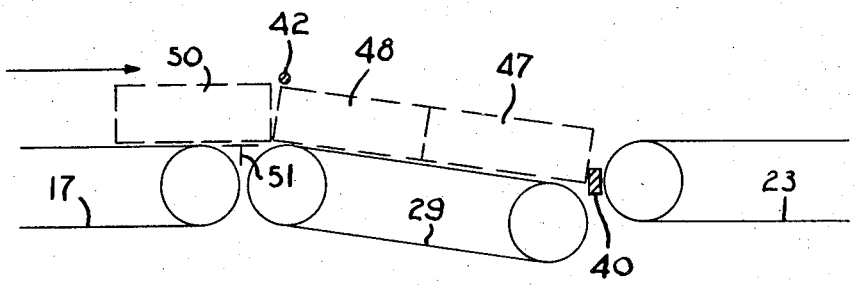
Figure 7:
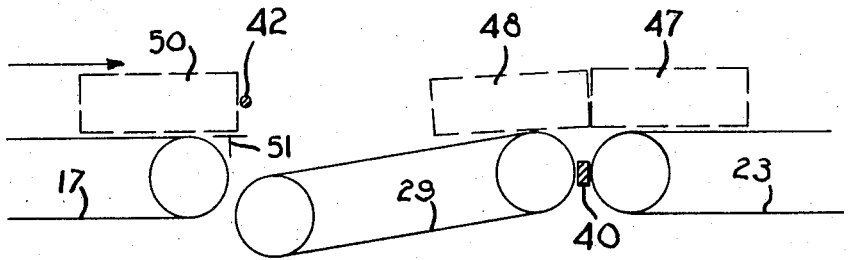

FIGS. 5, 6 and 7 illustrate the operation of the apparatus for grouping and handling article units. Each article unit in the example comprises two rectangular cartons 47, 48. The illustrated purpose of the assembly is to group the cartons or articles 47, 48 in longitudinally abutting positions and to physically space the article unit composed of cartons 47, 48 from the rearwardly adjacent article 50 carried along delivery conveyor 14.

As the articles or article units are being transferred from delivery conveyor 14 to collecting conveyor 16, the attitude of conveyor 16 is such as to locate its rear end in co-planar relation to the exit end of delivery conveyor 14. In other words, the collecting conveyor 16 is inclined downwardly and forwardly from the delivery conveyor 14. This position is manually or automatically controlled by cylinder assembly 44.

As the first article 47 is received on the moving belt 29, it passes beneath stop 42 and comes to rest against the fixed stop plate 40 at the front end of conveyor 16 (FIG. 5). It is followed by the second article 48, which also passes beneath stop 42 and comes to rest in abutment with article 47. The belt 29 moves continuously, but slips beneath the stationary articles 47, 48. As shown in FIG. 6, the next article 50 will come to rest in abutment with article 48, and belt 17 will slip beneath it. The spacing of the stop plate 40 and the transverse stop 42 is such as to locate transverse stop 42 above and slightly forward of the rear end of the article unit, which comprises the two abutting articles 47, 48. The rear surface of stop 42 is therefore slightly forward of the front end of article 50.

The article unit is discharged from the collecting conveyor 16 by operation of cylinder assembly 44, which is retracted to position the conveyor 16 as shown in FIGS. 4 and 7. The rear end of collecting conveyor 16 is thereby elevationally depressed and its front end is raised to a position co-planar with the rear end of receiving conveyor 15.

The pivotal movement of collecting conveyor 16 simultaneously positions stop 42 in the path of movement of article 50 and raises the belt 29 so as to permit the article unit comprised of articles 47, 48 to pass over the fixed stop plate 40. The faster speed of belt 29, described above, insures that the articles 47, 48 will remain in abutment with one another as they are transferred onto the slower moving belt 23 of receiving conveyor 15. The article unit will therefore be moved along the receiving conveyor 15 in a spaced position with respect to articles rearward of them. Such spacing is useful in placing empty cases over the article unit or in directing the article unit to a conveyor moving perpendicular to the longitudinal path of conveyors 14, 15, 16.

The proper operation of the apparatus for grouping and separating article units as shown in FIGS. 5, 6 and 7 operates equally well with the incoming articles being in direct abutment with one another along with the delivery conveyor 14 or being irregularly separated. Since the controlling stop 42 is not inserted between abutting cartons, the operation of the apparatus does not depend on any fixed spatial relationship of articles on conveyor 14. Stop 42 will prevent transfer of articles from conveyor 14 to conveyor 16, at any time that articles are being transferred from conveyor 16 to conveyor 15.

FIGS. 8–11 schematically illustrate possible variations in the assembly. They are not intended to exhaust the possible variations which might be utilized within the scope of this disclosure.

Figure 8:
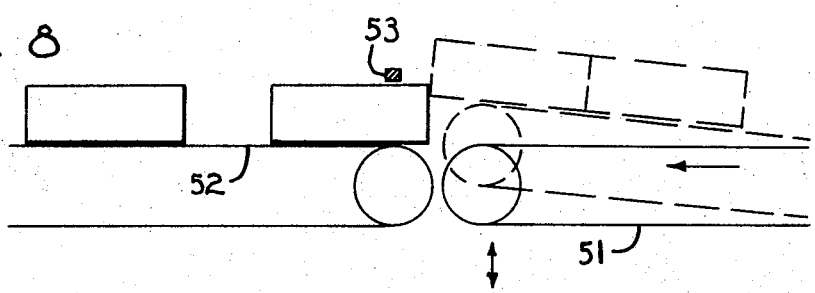
FIG. 8 is a schematic view showing an alternative form of the invention for spacing individual articles.
Figure 9:
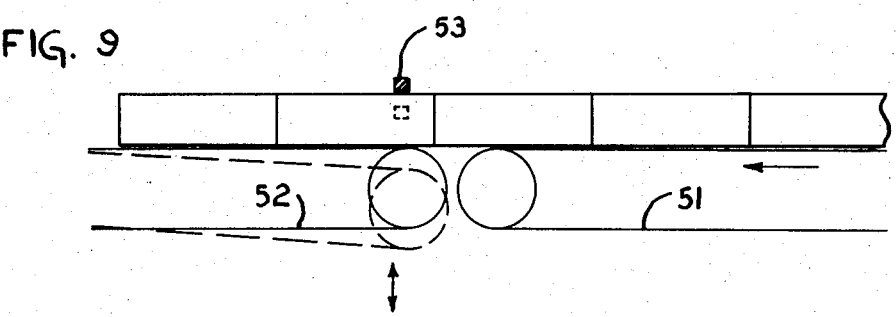
FIG. 9 is a schematic view showing another alternative form of the invention for spacing individual articles.

FIGS. 8 and 9 show an apparatus concerned only with the spacing of articles along a moving conveyor. Two constantly moving endless conveyors are illustrated — a delivery conveyor 51 and a receiving conveyor 52. The upper flights of conveyors 51, 52 constantly move from right to left. A transverse stop 53 is elevationally fixed with respect to the receiving conveyor 52 and is located adjacent the rear end thereof. Its height above the upper surface of conveyor 52 is such as to permit movement of articles beneath it on the conveyor 52.

The delivery end of conveyor 51 is elevationally movable between the position shown in full lines and that illustrated in dash lines. In its full line position, articles are transferred from conveyor 51 to conveyor 52 beneath stop 53. In its dashed line position, such transfer of articles is prevented by the blocking action of stop 53.

The apparatus schematically shown in FIG. 8 can be used to longitudinally separate abutting articles carried along conveyor 51. By timing the elevational shift of the delivery end of conveyor 51, one can permit individual article units to pass beneath stop 53 and block transfer of subsequent article units so as to effect the desired spacing of article units along conveyor 52.

FIG. 9 shows a variation in the structure illustrated in FIG. 8. In this instance the receiving conveyor 52 is constructed such that its rear end is elevationally movable between the full line position and a depressed position shown in dashed lines. Stop 53 moves with conveyor 52 so as to alternately permit transfer of article units or block such transfer.

Figure 10:
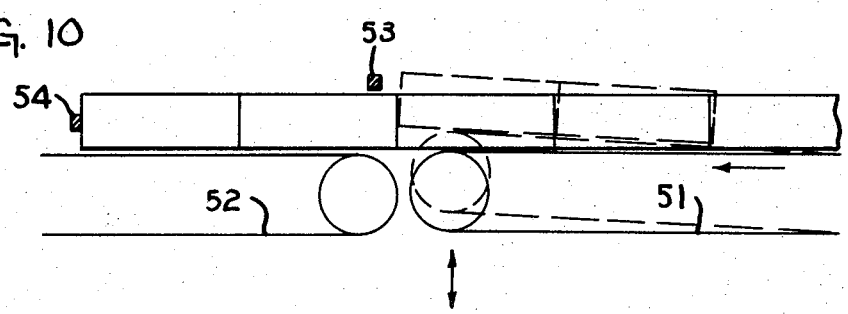
FIG. 10 is a schematic view showing an alternative form of the invention for grouping and spacing articles.
Figure 11:
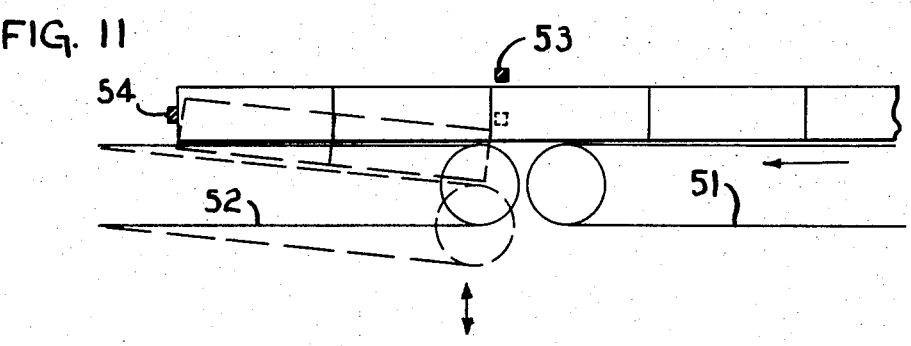
FIG. 11 is a schematic view showing another alternative form of the invention for grouping and spacing articles.

FIGS. 10 and 11 illustrate schematically the grouping of article units on receiving conveyor 52. FIG. 10 shows the assembly constructed as described with respect to FIG. 8, but illustrates the addition of a movable stop member 54 which is transversely or elevationally movable between the position in the path of the articles on conveyor 52 or clear of such path. Where the articles along conveyor 52 are not in abutment with one another, the movable stop 54 is used to prevent movement of articles on conveyor 52 until the desired article unit has been collected. The stop 54 is then moved clear of the article unit and conveyor 51 is elevated to its dashed line position simultaneously so as to block transfer of subsequent articles from conveyor 51 to conveyor 52.

FIG. 11 shows the movable stop 54 provided in conjunction with the construction illustrated in FIG. 9.

The grouping of articles on the receiving conveyor 52 might also be achieved by stopping the movement of the conveyor surface for conveyor 52, allowing the delivery conveyor 51 to push articles onto conveyor 52 in sequence. By simultaneously effecting the elevational shift to block transfer of articles by abutment with stop 53 and powering conveyor 52, the grouped articles could be maintained in desired abutment.

As used herein, the conveyors are shown as endless belt conveyors. However, they might be comprised of any suitable conveyor structure with provision for allowing slippage of the conveyor surfaces beneath the articles when required by operation of the unit. Conventional belts, chains, roller conveyors or smooth fixed surfaces might be substituted for the belt conveyors illustrated.

The described apparatus lends itself to conventional automatic controls to sequence the operation of the cylinder assembly 44 or other suitable operating devices substituted therefore. In the detailed example, photoelectric cells and lamps (not shown) might be mounted on framework 10 and directed across collecting conveyor 16 so as to intersect the position of articles stopped thereon by abutment with the stop plate 40. By using a separate photoelectric control to detect the presence of each article required to complete the desired article unit, the controls can automatically sense the presence of the article unit and cause cylinder assembly 44 to operate so as to discharge the article unit onto the receiving conveyor 15. The variety of conventional controls that might be directed to such automatic operation is believed to be within the skill of those designing such equipment.

Because of the many modifications that might be made in the adaptation of the present invention to a particular conveyor system or manufacturing or packaging process, the invention is not to be limited to the precise structures shown, but is set out in the appended claims.

Having thus described my invention, I claim:

1. An apparatus for longitudinally spacing articles along a conveyor, comprising:
   first and second conveyors including longitudinally aligned conveyor surfaces oriented with the respective ends of the conveyors adjacent to one another;
   power means operatively connected to said conveyor for moving articles supported upon their respective surfaces in a common forward direction along a longitudinal path leading from said first conveyor to said second conveyor;
   a transverse stop spaced above the conveyor surfaces adjacent to the rear end of said second conveyor; and
   elevating means operatively connected to one of said conveyors for effecting relative elevational movement of the respective adjacent ends of the conveyors between a first position at which articles are transferred from said first conveyor to said second conveyor beneath said stop and a second position wherein such transfer is prevented by abutment of the stop by articles on said first conveyor.

2. The apparatus as set out in claim 1 wherein the transverse stop is positioned across the end of said second conveyor adjacent to said first conveyor, said transverse stop being elevationally fixed relative to the surface of said second conveyor at a height sufficient to clear articles supported thereon.

3. The apparatus as set out in claim 1 wherein the transverse stop is positioned across the end of said second conveyor adjacent to said first conveyor, said transverse stop being elevationally fixed relative to the surface of said second conveyor at a height sufficient to clear articles supported thereon;
   said elevating means being operatively connected to said second conveyor, whereby the conveyor surfaces are co-planar when the ends thereof are at said first position and whereby the surface of said second conveyor at its end adjacent the first conveyor is elevationally offset lower than the adjacent surface of the first conveyor when the ends thereof are of said second position, the amount of elevational offset being such as to locate the transverse stop at an elevation relative to the first conveyor surface less than the height of articles supported thereon.

4. The apparatus as set out in claim 1 wherein the transverse stop is positioned across the end of said second conveyor adjacent to said first conveyor, said transverse stop being elevationally fixed relative to the surface of said second conveyor at a height sufficient to clear articles supported thereon;
   and forward stop means interposed in the path of articles on said second conveyor for selectively preventing forward movement of an article unit at a position along said second conveyor wherein the rear end of the article unit is located beneath said transverse stop.

5. The apparatus set out in claim 4 wherein said second conveyor is transversely pivoted about a fixed axis intermediate the ends thereof.

6. The apparatus set out in claim 4 wherein said second conveyor is transversely pivoted about a fixed axis intermediate the ends thereof;
   and a third conveyor including a conveyor surface longitudinally aligned with the surface of said first and second conveyors, one longitudinal end of said third conveyor being adjacent to the forward end of said second conveyor and being located elevationally above the stationary abutment.

7. The apparatus set out in claim 4 wherein said second conveyor is transversely pivoted about a fixed axis intermediate the ends thereof;
   said forward stop means comprising a stationary abutment located at the forward end of said second conveyor within the path of articles thereon;
   the upper surface of the abutment being at a fixed elevation with respect to said second conveyor axis such that the articles on the surface of said second conveyor clear the abutment when the adjacent conveyor ends are at said second position and engage the abutment when the adjacent conveyor ends are at said first position.

8. The apparatus as set out in claim 4 wherein said second conveyor is transversely pivoted about a fixed axis intermediate the ends thereof;

and a third conveyor including a conveyor surface longitudinally aligned with the surfaces of said first and second conveyors, one londitudinal end of said third conveyor being adjacent to the forward end of said second conveyor and being located elevationally above the stationary abutment;

said power means being operatively connected to said third conveyor so as to move articles supported thereon in said common forward direction at a speed less than the speed imparted to articles when moved along said second conveyor.

9. The apparatus set out in claim 8 wherein the conveyor surface of said first and third conveyors are coplanar;

said second conveyor being pivoted about said fixed axis at the longitudinal center of said second conveyor;

the elevation of said second conveyor surface above said fixed axis being lower than the elevation of the conveyor surfaces of said first and third conveyors.

10. An apparatus for grouping and spacing articles, comprising:

a first longitudinal conveyor having an article support surface;

a second longitudinal conveyor having an article support surface longitudinally aligned with the support surface of said first conveyor;

means operatively connected to said first and second conveyors for moving the respective support surfaces thereof in a common direction whereby articles are successively transferred from said first conveyor to said second conveyor;

a stop mounted elevationally above the support surface of said second conveyor at the end thereof adjacent to said first conveyor, said stop being clear of the path of articles located on the support surface of said second conveyor;

and means for shifting the relative elevations of the first and second conveyors at their respective ends adjacent to one another between a first condition wherein articles are transferred beneath said stop from said first conveyor to said second conveyor and a second condition wherein such transfer is blocked by said stop.

11. An article handling apparatus, comprising:

delivery means for movably carrying successive articles along a longitudinal path;

article collecting means adjacent the delivery means and aligned along said longitudinal path for receiving thereon a predetermined article unit supplied thereto by said delivery means;

and receiving means adjacent to said article collecting means for receiving article units discharged from said article collecting means;

means for spatially locating an article unit upon said article collecting means as it is received thereon from said delivery means;

article engaging stop means on said article collecting means located upwardly adjacent to an article unit located thereon and positioned immediately inward of that end of an article unit on said article collection means adjacent to said delivery means;

and means for shifting the relative elevations of the delivery means and article collecting means at their respective ends adjacent to one another between a first condition wherein an article unit is transferred from said delivery means onto said article collecting means beneath said stop means and a second condition wherein such transfer is blocked by said stop.

12. An article grouping and spacing apparatus, comprising:

a first longitudinal conveyor having a movable article support surface;

a second longitudinal conveyor having a movable article support surface longitudinally aligned with the surface of said first conveyor, said surfaces being longitudinally spaced from one another by a distance substantially equal to the length of an article unit;

and a third longitudinal conveyor having a movable article support surface positioned between and longitudinally aligned with the surfaces of said first and second conveyors;

means operatively connected to the first, second and third conveyors for moving the respective article support surfaces thereof in a common longitudinal direction; whereby articles can be successively transferred from said first conveyor, to said third conveyor and to said second conveyor;

stop means mounted on said third conveyor above the article support surface and adjacent to said first conveyor;

and selectively operable means for alternately shifting the longitudinal path of articles being transferred to said third conveyor from said first conveyor between a first elevation clear of said stop means and a second elevation wherein the stop means intersects the path and prevents such transfer.

13. An apparatus for grouping and spacing articles, comprising:

a first conveyor having an upwardly facing surface along which articles are supported during movement toward an exit end thereof;

a second conveyor having an upwardly facing surface along which articles are supported after reception thereon, said second conveyor being spaced from the exit end of said first conveyor by a distance substantially equal to the length of an article unit;

a collecting conveyor interposed between the exit end of said first conveyor and said second conveyor, said collecting conveyor being longitudinally aligned with said first conveyor and being of a length substantially extending along the space separating said first and second conveyors;

a first stop located between the collecting conveyor and second conveyor adapted, when operative; to spatially locate an article unit upon the collecting conveyor;

a second stop located on the collecting conveyor immediately above and inwardly adjacent to the end of an article unit located therein;

and means operatively connected to said collecting conveyor for elevationally repositioning the end of the collecting conveyor adjacent to the exit end of said first conveyor and rendering said first stop inoperative, whereby said second stop is placed in the path of movement of articles at the exit end of the first conveyor as an article unit is discharged from the collecting conveyor onto the surface of said second conveyor.

* * * * *